United States Patent
Whited et al.

(10) Patent No.: US 7,504,464 B2
(45) Date of Patent: Mar. 17, 2009

(54) PROCESS FOR CONTROL OF POLYMER FINES IN A GAS-PHASE POLYMERIZATION

(75) Inventors: Stephanie M. Whited, Charleston, WV (US); Michael D. Turner, Hurricane, WV (US); Michael A. Kinnan, Charleston, WV (US); Robert J. Jorgensen, Scott Depot, WV (US)

(73) Assignee: Univation Technologies, LLC, Houston, TX (US)

( * ) Notice: Subject to any disclaimer, the term of this patent is extended or adjusted under 35 U.S.C. 154(b) by 3 days.

(21) Appl. No.: 10/553,689

(22) PCT Filed: Apr. 7, 2004

(86) PCT No.: PCT/US2004/010572

§ 371 (c)(1),
(2), (4) Date: Oct. 18, 2005

(87) PCT Pub. No.: WO2005/012371

PCT Pub. Date: Feb. 10, 2005

(65) Prior Publication Data

US 2006/0287445 A1    Dec. 21, 2006

Related U.S. Application Data

(60) Provisional application No. 60/469,663, filed on May 12, 2003, provisional application No. 60/469,664, filed on May 12, 2003.

(51) Int. Cl.
*C08F 4/642* (2006.01)
(52) U.S. Cl. .................... 526/124.2; 526/124.8
(58) Field of Classification Search ............. 526/124.2, 526/124.8
See application file for complete search history.

(56) References Cited

U.S. PATENT DOCUMENTS

| | | | |
|---|---|---|---|
| 4,302,565 A | 11/1981 | Goeke et al. | |
| 4,330,649 A | 5/1982 | Kioka et al. | |
| 4,442,276 A | 4/1984 | Kashiwa et al. | |
| 4,460,701 A | 7/1984 | Terano et al. | |
| 4,472,521 A | 9/1984 | Band | |
| 4,482,687 A | 11/1984 | Noshay et al. | |
| 4,508,842 A | 4/1985 | Beran et al. | |
| 4,535,068 A | 8/1985 | Job | |
| 4,540,679 A | 9/1985 | Arzoumanidis et al. | |
| 4,547,476 A | 10/1985 | Terano et al. | |
| 4,548,915 A | 10/1985 | Goodall et al. | |
| 4,728,705 A | 3/1988 | Nestlerode et al. | |
| 4,816,433 A | 3/1989 | Terano et al. | |
| 4,829,037 A | 5/1989 | Terano et al. | |
| 4,927,797 A | 5/1990 | Ewen | |
| 4,990,479 A | 2/1991 | Ishimaru et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,106,806 A | 4/1992 | Job | |
| 5,122,494 A | 6/1992 | Job | |
| 5,124,298 A | 6/1992 | Job | |
| 5,146,028 A | 9/1992 | Job | |
| 5,151,399 A | 9/1992 | Job | |
| 5,153,158 A | 10/1992 | Kioka et al. | |
| 5,229,342 A | 7/1993 | Job | |
| 5,247,031 A | 9/1993 | Kioka et al. | |
| 5,247,032 A | 9/1993 | Kioka et al. | |
| 5,290,745 A | 3/1994 | Jorgensen et al. | |
| 5,969,061 A | 10/1999 | Wonders et al. | |
| 6,187,866 B1 * | 2/2001 | Jorgensen et al. ........... 525/197 |
| 6,248,831 B1 | 6/2001 | Maheshwari et al. | |
| 6,511,935 B2 | 1/2003 | Job | |
| 6,617,405 B1 * | 9/2003 | Jorgensen ................ 526/123.1 |

FOREIGN PATENT DOCUMENTS

| | | |
|---|---|---|
| EP | 0783007 | 7/1997 |
| WO | 01/05845 | 1/2001 |

* cited by examiner

*Primary Examiner*—Caixia Lu
(74) *Attorney, Agent, or Firm*—Leandro Arechederra, III

(57) ABSTRACT

A gas phase polymerization process comprising: (1) preparing a solution of a catalyst precursor comprising a mixture of magnesium and titanium compounds, an electron donor and a solvent; (2) adding a filler to the solution from step (1) to form a slurry; (3) spray drying the slurry from step (2) at a temperature of 100 to 140° C. to form a spray dried precursor, (4) slurring the spray dried precursor from step (3) in mineral oil, (5) partially or fully pre-activating the catalyst precursor by contacting the slurry of (4) with one or more Lewis Acids, and (6) transferring the partially or fully activated precursor from step (5) into a gas phase reactor in which an olefin polymerization reaction is in progress.

22 Claims, 1 Drawing Sheet

PROCESS FOR CONTROL OF POLYMER FINES IN A GAS-PHASE POLYMERIZATION

CROSS REFERENCE TO RELATED APPLICATIONS

This application claims benefit of priority from PCT/US2004/010572, filed Apr. 7, 2004, which in turn claims benefit of U.S. Provisional Applications 60/469,663 and 60/469,664, both filed May 12, 2003.

BACKGROUND OF THE INVENTION

The use of Ziegler-Natta catalyst systems to promote various olefin polymerizations is well known. These catalyst systems function in both the gas phase, and slurry as well as solution polymerization processes. Of these processes, the gas phase and slurry polymerization processes are also known as particle form processes, socalled because the polymer is formed as discrete particles, the size and shape of which is a function of the size and shape of the catalyst particle. The polymer particle is thus said to replicate the initial catalyst particle. The final size of the polymer particle is a function of both the initial catalyst particle size and the productivity of the catalyst. Thus, in preparing a catalyst to be used in a gas-phase polymerization process, great care is taken in the catalyst precursor preparation in order to control both polymer particle size and morphology in addition to productivity. Examples of such Ziegler-Natta catalysts include those disclosed in U.S. Pat. Nos. 4,302,565; 4,482,687; 4,508,842; 4,990,479; 5,122,494; 5,290,745; and, 6,187,866.

Another polymer property that is desirably controlled through catalyst control is the particle size distribution, especially with respect to the low end of the distribution, as an unacceptable amount of small catalyst particles could lead to the generation of small polymer particles known as "polymer fines". Polymer fines are undesirable in gas phase fluidized bed polymerization systems, as they tend to segregate to the top of the fluidizing bed, causing problems with bed level control. They are also preferentially entrained into the cycle gas leading to system plugging in heat exchangers and compressors, buildup in the bottom head of the reaction system and formation of gels due to continued polymerization at lower temperatures than the bulk of the polymer product. All of the above lead to poor commercial operation, reduced polymerization efficiency, and generally impaired operation. High levels of fines can also cause problems in downstream handling of the polymer once it exits the polymerization system. Fines can cause poor flow in purge bins, plug filters in bins and present safety problems. The above problems make elimination or reduction of polymer fines important to commercial operation of a gas-phase polymerization process.

In a multiple series reactor system, where the composition of the polymers produced in the separate reactors is often widely variant, the presence of polymer fines is particularly harmful to continuous and smooth operation. This is due to the extreme importance of precise bed level control as the product properties of the polymer are strongly influenced by the relative amount of polymer produced in each reactor. If the bed weights are not precisely known, it is extremely difficult to properly control the product exiting the final reactor.

With respect to the preparation of linear low density polyethylene and other ethylene/α-olefin copolymers, it is preferred to produce polymer in the separate reactors with both large molecular weight differences and relatively large differences in incorporated comonomer. To produce final polymers with the best physical properties, it is preferred to have one of the reactors produce a polymer with high molecular weight and incorporating a majority of the comonomer. In the second reactor, a low molecular weight portion of the polymer is formed which may also have comonomer incorporated, but normally in an amount less than that incorporated in the high molecular weight portion. When the high molecular weight component is produced first, polymer fines can become a significant problem, especially when the flow index (I21) of the resulting polymer is in the range from 0.1 to 2.0 g/10 min, and the incorporated comonomer content is less than 5 weight percent, especially less than 4.5 wt weight percent.

Depending on the order of production of the different polymers in the multiple reactor system (that is high molecular weight first, lower molecular weight second or the reverse), the fines will tend to have significantly different polymer properties than the bulk of the polymer granules. This is due to the fact that the fines also tend to be the youngest particles in the reactor and hence have had insufficient residence time in the reactor to produce a representative amount of polymer before transit to the second reactor in series.

This in turn leads to further problems in compounding of the polymer into pellets for end-use. In particular, the fines are normally of significantly different molecular weight or branching composition compared to the bulk polymer. Although the particles of both the bulk material and the fines will melt at roughly the same temperature, mixing is hampered unless the products have a similar isoviscous temperature (that is the temperature at which the melt viscosity of the two products is essentially the same). These polymer fines, which tend to be of significantly different molecular weight than the bulk of the polymer and differing isoviscous temperature, are then poorly mixed with the bulk phase. Upon cooling after pellet formation, these poorly mixed regions, if of sufficient size, will be visible in blown films as gels or in other extruded articles, resulting in visual defects and stress concentrators leading to premature failure of an article made therefrom.

Thus, polymer fines are, in general a problem for gas phase olefin polymerization processes and, in particular an issue for staged or series reactor systems in which precise control of polymer composition is only achieved by precise control of the relative amount of polymer produced in the multiple reactors.

Polymer fines can be removed from the polymerization reactor though use of a cyclone on the recycle line, however this reduces productivity and increases operating costs. In addition, the fines tend to be higher in catalyst concentration as they are, on average, younger particles. Removing these particles from the polymerization reactor increases the need for fresh catalyst further increasing costs. Since the polymer fines are still active for further polymerization, special care must be taken to make sure that the fines do not plug the cyclone. Any areas in which polymer particles can congregate in the presence of olefin can result in continued polymerization leading to formation of agglomerated particles and large chunks of polymer.

U.S. Pat. No. 5,969,061 disclosed the use of a solvent in an attempt to reduce polymer fines by making the bulk of the polymer particles stickier, resulting in the fines attaching to the larger particles. However, increasing polymer stickiness can result in further problems downstream in product separation and makes the reaction system more vulnerable to loss of recycle flow due to power failures, increasing the risk of large agglomerate formation. The addition of large amounts of solvent also increases the cost and complexity of the reaction system and requires apparatus for recycle of the solvent for reuse. It would be desirable to produce fewer fines during the polymerization reaction, thereby reducing the need for other polymer fines control systems.

In gas phase polymerization systems, it is known that, generally, each catalyst particle produces one polymer particle. Catalyst particles, in general increase in particle size proportionally to the cube root of the catalyst productivity. That is, the polymer particle size is expressed by the formula: polymer particle size=Constant×(Catalyst Productivity)$^{1/3}$.

While not being bound by any one theory, it is believed that polymer fines originate either from fines in the catalyst or by particle attrition of the growing polymer. Given that fines can still be present in a polymer produced in the first reactor of a multiple reactor configuration producing tough, high mechanical strength, high molecular weight polymer, it is unlikely that particle attrition is the primary cause of polymer fines in such systems. Thus, catalyst particle fines are believed to be the predominant cause of polymer fines. Such catalyst fines can be removed by a variety of methods, ranging from eluting to sieving of the catalyst prior to use. This, however, adds both cost and complexity to the catalyst preparation process as well as increases the likelihood of catalyst contamination during the additional processing steps.

Operating the reaction system at higher levels of catalyst productivity can also reduce polymer fines. For single reactor systems, this is usually a feasible approach, however operating at catalyst productivity levels that are too high can result in operability problems due to polymer particle agglomeration. In extreme cases, higher levels of fines due to fracture of catalyst particles during polymerization may also result. For multiple reactor systems in which the catalyst is added only to the first reactor in the series, increasing catalyst productivity in the first reactor to minimize fines can result in the inability to run the second (or additional) reactors at commercially feasible conditions due to catalyst deactivation.

In order to compensate for this activity loss due to catalyst deactivation, the first reactor of the multiple reactor system is often operated in a "low productivity" regime so that there is sufficient catalyst activity remaining to complete polymerization in the second (and subsequent) reactors. However, the operation at lower catalyst productivity in the first reactor results in a reduction in polymer particle size, further increasing the need to control and reduce fines which might be caused by the catalyst.

As already explained, the particle size of a given polymer particle is a function of both the initial catalyst particle size, and the productivity of the catalyst; that is how much polymer grows from the initial catalyst particle during the polymerization process. Thus small particle sized polymer or polymer fines can be a result of either small initial catalyst particle size or low catalyst productivity, or both, and when both conditions are present, the generation of polymer fines is exacerbated.

The catalysts used in many olefin polymerization processes are of the Ziegler-Natta type. In particular, for gas phase polymerizations, the catalyst is often made from a precursor comprising magnesium and transition metal halides, particularly titanium chlorides in an electron donor solvent. This solution is often either deposited on a porous catalyst support, or a filler is added, which, on subsequent spray drying, provides additional mechanical strength to the particles. The solid particles from either method of production are often slurried in a diluent to produce a high viscosity mixture, which is then used in a gas-phase polymerization. Exemplary catalyst compositions are described in U.S. Pat. Nos. 6,187,866 and 5,290,745. Precipitated/crystallized catalyst compositions such as those described in U.S. Pat. Nos. 6,511,935 and 6,248,831, may also be used. Additional techniques for forming suitable catalyst precursors for use herein are disclosed in U.S. Pat. Nos.: 5,247,032, 5,247,031, 5,229,342, 5,153,158, 5,151,399, 5,146,028, 5,124,298, 5,106,806, 5,082,907, 5,077,357, 5,066,738, 5,066,737, 5,034,361, 5,028,671, 4,990,479, 4,927,797, 4,829,037, 4,816,433, 4,728,705, 4,548,915, 4,547,476, 4,540,679, 4,535,068, 4,472,521, 4,460,701, 4,442,276, and 4,330,649.

One advantage of the use of a spray drying process is that it allows the particle size and morphology of the catalyst, and hence the final product, to be controlled by variation of the process parameters of the spray dryer. Such parameters include the speed of the atomizer, the solids content of the slurry to be dried, the inlet and outlet gas temperatures of the dryer and the feed rate of the slurry to the atomizer.

However, due to the nature of spray drying, some small particles are always present. In particular, some "micro-fine" particles are formed during the spray drying process. These are also frequently called "daughter" particles and result from break up of droplets during the spray drying operation. These particles end up in the final spray dried catalyst composition and are of essentially the same chemical composition as the larger size, desired particles. These particles are seen in the <10 micron fraction of the particle size distribution of the catalyst and can form fine polymer particles that are the root of operational problems.

The catalyst precursor as produced is essentially inactive for olefin polymerization due to the presence of the Lewis Base electron donor. Activation of the catalyst precursor requires the removal of the electron donor from the vicinity of the active site, that is, the metal and, if necessary, reduction of the metal. The activator extracts the electron donor compound from the active site in one of several ways. The electron donor can be removed by complex formation, or by alkylation or by reduction and alkylation if the valence state of the metal requires reduction. Typical activating compounds are Lewis Acids. The activator is used to remove at least 90 percent, preferably all or as near to all as possible, of the electron donor from the active site, that is, the transition metal.

If the Lewis Acid is a non-reducing compound, such as $BCl_3$, $AlCl_3$, or similar chlorinating agent, a reducing compound, typically a trialkylaluminum an aluminum dialkyl halide may be added to fully activate the catalyst precursor. Precursors that are not fully halogenated will also require either use of a halogen donating Lewis Acid or a separate halogenation step prior to use.

Activation of the catalyst typically occurs in the polymerization reactor by the cocatalyst. However, complete activation of the catalyst inside the polymerization reactor typically requires a substantial excess of activator compound and in-the case of higher ($C_3$, $C_4$ and up) olefin polymerizations, reintroduction of a Lewis base as a selectivity control agent. Advantages to this technique are its simplicity of catalyst manufacture and feed. However, use of excess activator compound not only leads to added operational expense, but it may cause operational problems or detriment to the final product. Ultimately, large quantities of activator are required due to dilution by monomers, diluents, condensing agents, and other components within the reactor.

Partial pre-activation can occur prior to the polymerization reactor, however this additional step, because it potentially increases the exposure of the active catalyst to impurities and other deactivators, can cause a decrease in catalyst productivity especially on extended storage prior to use. Such a deactivation and loss of productivity would in turn be expected to cause an increase in polymer fines. Thus, as full activation of the catalyst is normally completed in the polymerization reactor with excess co-catalyst and generally occurs whether the catalyst has been partially activated or not, until now there has been no driving force to pursue partial pre-activation of the catalyst prior to addition to the reactor.

However, it would still be highly advantageous to have a process that would minimize the generation of polymer fines in a gas phase polymerization. It would also be advantageous if this process were to be applicable to a gas phase process utilizing multiple reactors. It would be even more advantageous if such a process involved a relatively simple manipulation of the catalyst rather than the more expensive and difficult process modifications such as cyclone operation or addition of solvents to the reactor. Finally, a process in which fully activated catalyst composition is supplied to the reactor would additionally be desirable.

SUMMARY OF THE INVENTION

The present invention is a process for reducing the amount of polymer fines in a gas phase particle form polymerization process by at least partially pre-activating the catalyst precursor by the addition of a Lewis acid to the catalyst precursor prior to its introduction to the polymerization reactor.

More specifically, the present invention relates to a gas phase olefin polymerization process comprising:
(1) preparing a solution of a catalyst precursor comprising a mixture of magnesium and titanium compounds, an electron donor, and optionally a solvent;
(2) adding a filler to the solution from step (1) to form a slurry;
(3) spray drying the slurry from step (2) at a temperature of 100 to 140° C. to form a spray dried precursor;
(4) slurrying the spray dried precursor from step (3) in mineral oil,
(5) partially or fully pre-activating the catalyst precursor by contacting the slurry of (4) with one or more Lewis Acids, and
(6) transferring the partially or fully activated precursor from step (5) into a gas phase reactor in which an olefin polymerization reaction is in progress.

Alternatively the process may comprise:
(1) preparing a solution of a catalyst precursor comprising a mixture of magnesium and transition metal compounds an electron donor and optionally a solvent;
(2) adding a porous catalyst support, to the solution from step (1) to form a slurry;
(3) drying the slurry from step (2) to form a solid catalyst precursor;
(4) re-slurrying the solid catalyst precursor from step (3) in mineral oil,
(5) partially or fully activating the catalyst precursor by contacting the slurry of (4) with a Lewis Acid; and
(6) transferring the partially or fully activated catalyst precursor from step (5) into a gas phase reactor in which an olefin polymerization reaction is in progress.

DETAILED DESCRIPTION OF THE INVENTION

Figure 1:
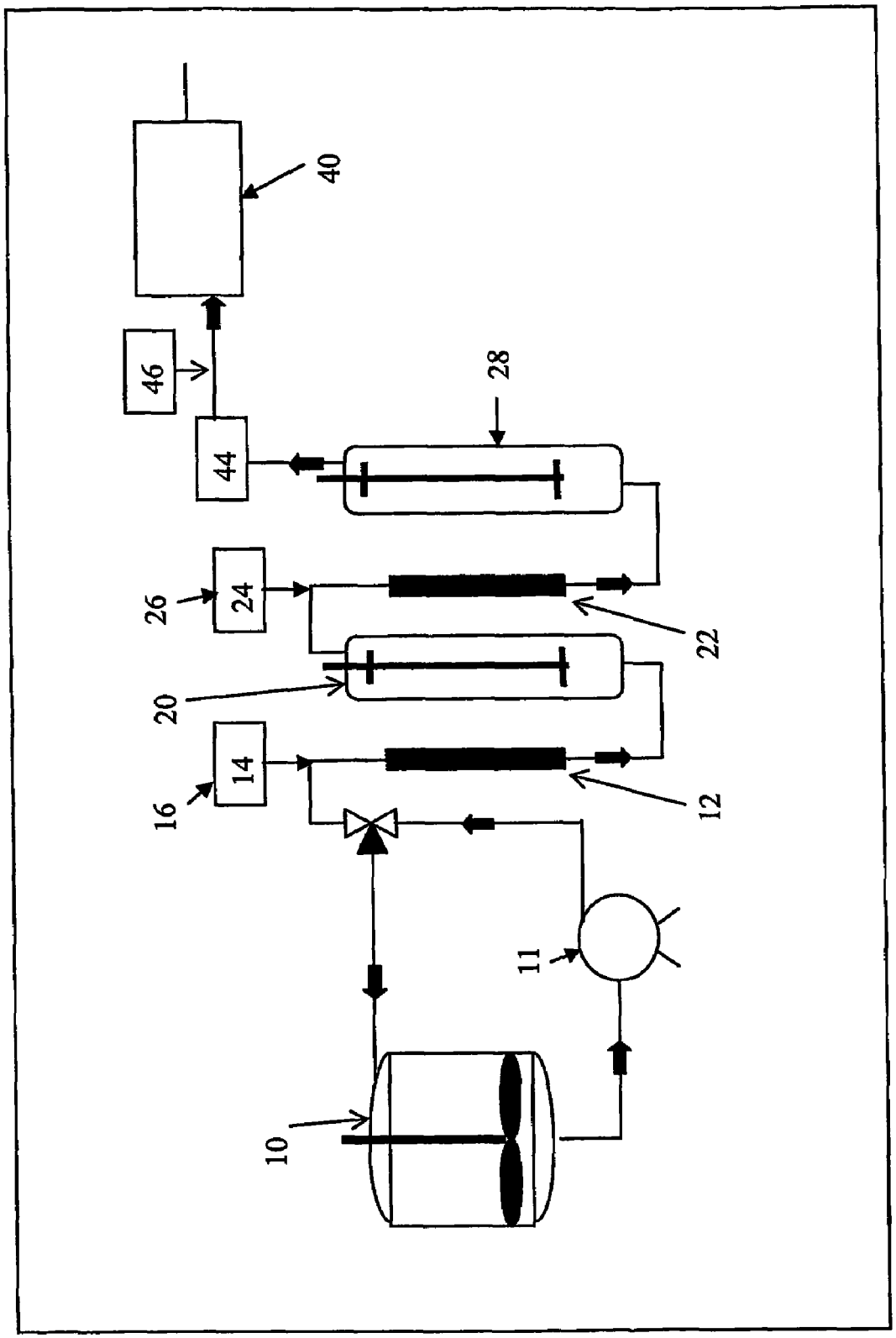
FIG. 1 shows a schematic flow chart of the catalyst activation process of the present invention.

For purposes of United States Patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

The term "polymer fines" as used herein means polymer particles of less than 125 µm in particle size.

The term "catalyst precursor" as used herein means a mixture comprising transition metal and magnesium compounds and a Lewis Base electron donor. Preferably the catalyst precursor has the formula $Mg_d(M)(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; M is a transition metal, preferably titanium, zirconium, hafnium, vanadium or a mixture thereof; X is independently chlorine, bromine or iodine; ED is an electron donor; d is 0.5 to 56; e is 0, 1, or 2; f is 1 to 116; and g is >2 and up to 1.5(d)+3. It is prepared by combining one or more transition metal compounds, a magnesium compound, and an electron donor, optionally in a solvent, and forming a solid particulated product therefrom.

Preferred transition metal compounds are titanium compounds, most preferably of the formula $Ti(OR)_eX_h$ wherein R, X, and e are as defined above; h is an integer from 1 to 4; and e+h is 3 or 4. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, $Ti(acetylacetonate)_2Cl_2$, $TiCl_3(acetylacetonate)$, and $TiBr_4$. $TiCl_3$ and $TiCl_4$ are preferred titanium compounds. The magnesium compounds include magnesium halides such as $MgCl_2$, $MgBr_2$, and $MgI_2$. Anhydrous $MgCl_2$ is a preferred compound. Desirably 0.5 to 56, and preferably 1 to 10, moles of the magnesium compound are used per mole of titanium compound in forming the precursor. Vanadium, hafnium and zirconium compounds may be used in admixture with the titanium component if desired. Specific vanadium compounds which may be used are $VCl_3$, $VOCl_3$, $V(acetylacetonate)_3$. Specific zirconium compounds that are useful are $ZrCl_4$, $ZrBr_4$, $ZrCl_2(acetylacetonate)_2$, and $Zr(OR^1)_4$ where $R^1$=ethyl, n-butyl, isobutyl, n-hexyl or n-octyl. Specific hafnium compounds useful in the invention are $HfCl_4$ and $Hf(OR^1)_4$, wherein $R^1$ is as previously defined.

Suitable catalyst precursors and methods of producing the same are known in the art and disclosed for example in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; and 5,247,032.

The electron donor is a Lewis base, preferably one that is liquid at temperatures in the temperature range from 0 to 200° C. and in which the magnesium and transition metal compounds are soluble. Examples include alkyl esters of an aliphatic or aromatic mono- or dicarboxylic acids, aliphatic ketones, aliphatic amines, aliphatic alcohols, alkyl-, cycloalkyl-, aryl-, and alkyaryl-ethers, compounds containing mixtures of the foregoing functionality, and mixtures thereof, each electron donor having 2 to 20 carbon atoms. Preferred are aliphatic and cycloaliphatic ethers having 2 to 20 carbon atoms; dialkyl-, diaryl-, and dialkaryl-ketones having 3 to 20 carbon atoms; dialkyl carbonates, alkylene carbonates, and alkyl-, alkoxyalkyl-, and aryl-esters of aliphatic or aromatic mono- or dicarboxylic acids or alkoxy-substituted derivatives thereof, having 2 to 20 carbon atoms. Specific examples of suitable electron donors are methylformate, ethylacetate, butylacetate, diethyl ether, tetrahydrofuran, dioxane, di-n-propyl ether, di-n-butyl ether, ethanol, 1-butanol, ethylformate, methylacetate, ethyl benzoate, ethyl p-methoxybenzoate, ethyl p-ethoxybenzoate, diethylphthalate, diisobutylphthalate, di-n-butylphthalate, diisooctylphthalate, ethylene carbonate, and ethylpropionate. The most preferred electron donor is tetrahydrofuran. Mixtures of electron donors may be used as well. Bicomponet mixtures, that is those mixtures employing Electron Donor (1) and Electron Donor (2) where the mole ratio of Electron Donor (1)/Electron Donor (2) ranges from 0.01:1 to 10:1 with a preferred range of 0.01:1 to 1:1. Highly preferably Electron Donor (2) is tetrahydrofuran, and it is present in excess. Especially preferred combinations of electron donor compounds are: ethanol with tetrahydrofuran; 1-butanol with tetrahydrofuran; isopropanol with tetrahydrofuran; ethylbenzoate with tetrahydrofuran, and diisobutylphthalate with tetrahydrofuran.

While a large excess of electron donor may be used initially to provide the reaction product of titanium compound and electron donor, the final catalyst precursor contains 1 to 20 moles and preferably 1 to 10 moles of electron donor per mole of titanium compound. Excess electron donor may be removed by extraction, washing or devolatilization and preferably is removed by drying during a spray drying process.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and transition metal compounds may be impregnated into a porous support and dried to form a solid catalyst, it is preferred that the solution is combined with a filler and converted into a solid catalyst via spray drying.

Formation of the Catalyst Precursor

The catalyst precursor may be prepared according to any suitable technique for preparing a particulated, solid product containing the electron donor. A preferred catalyst precursor comprises $TiCl_3$, formed by the reduction of $TiCl_4$ with magnesium metal in solution in the electron donor solvent. The electron donor employed in this embodiment of the invention must be free of substituents containing active hydrogen, such as hydroxyl groups, as such functional groups readily react with both magnesium and titanium tetrachloride. Reduction of titanium tetrachloride with magnesium metal according to the present invention takes place in a solvent comprising the electron donor and results in the formation of magnesium dichloride and titanium trichloride, which then form complexes with the electron donor. This reaction can be illustrated by the following equation: $2\ TiCl_4(ED)_2 + Mg \rightarrow 2\ TiCl_3(ED)_3 + MgCl_2(ED)_{1.5}$ where ED is as previously defined, preferably tetrahydrofuran.

Because magnesium is highly reactive with titanium tetrachloride, it is preferable to employ the metal in granular form rather than as a powder. The use of larger granular particles of the metal rather than the more minute powder form limits the reactivity of the metal and allows the reaction to proceed in a smoother and more controlled manner. Proceeding in this manner also limits over-reduction of titanium tetrachloride to titanium dichloride, which might otherwise occur. Usually magnesium particles having an average particle size of from 0.25 mm to 10 mm preferably from 1 mm to 4 mm, are employed.

Reduction of titanium tetrachloride to titanium trichloride is effected using an essentially stoichiometric amount of the magnesium metal required to effect the reduction, that is, one mole of magnesium metal is employed for every two moles of titanium tetrachloride. At least a stoichiometric amount of magnesium is required to completely reduce the titanium tetrachloride to titanium trichloride. On the other hand, an excess of magnesium is undesirable as such excess must then be removed from the reaction mixture. In addition, use of excess magnesium can cause over-reduction of titanium tetrachloride to titanium dichloride.

From 5 mols to 400 mols of electron donor compound are advantageously employed per mol of titanium tetrachloride, preferably 50 mols to 200 mols of electron donor compound per mol of titanium tetrachloride, with most of the residue being removed as explained earlier.

Usually the magnesium metal is added to a mixture of titanium tetrachloride dissolved in the electron donor compound. However, it is also possible to add the titanium tetrachloride to a mixture of the magnesium metal in the electron donor compound, or even to add the titanium tetrachloride and magnesium metal to the electron donor compound together. Ordinarily reaction is effected below the boiling point of the electron donor compound, preferably between 20 and 70° C. An inert atmosphere should be maintained, that is, an atmosphere that is nonreactive under the conditions employed during the reduction.

The reduction of titanium tetrachloride with magnesium metal results in a solution, which contains one mole of magnesium dichloride for every two moles of titanium trichloride, and which is substantially free of undesirable by-products. In order to complete formation of the desired catalyst precursor, it is only necessary to add additional magnesium dichloride to the solution to increase the Mg/Ti ratio to the desired level. The solution can then be impregnated in a suitable support, or spray dried with or without a suitable filler, to obtain discrete particles of the desired precursor.

After the completion of the magnesium metal reduction of the $TiCl_4$, additional transition metal compounds such as those defined previously may be added. Additional electron donor compounds, especially those which may have reactive functionality towards either Mg metal or $TiCl_4$ may be added as well. When added, the ratio of second transition metal compound to the Ti will range from 0.1:1 to 10:1 and preferably 1:1 to 5:1.

Magnesium dichloride may be added to the solution to increase the Mg/transition metal ratio depending upon whether the solution is to be impregnated in a suitable support or spray dried. Because drying is not constrained to occur completely within the pores of a support when the solution is spray dried, higher amounts of magnesium dichloride are ordinarily employed when this procedure is followed than when the solution is impregnated in a support. Generally, sufficient magnesium dichloride is added to the solution to increase the Mg/Ti ratio to a range of from 1:1 to 56:1, preferably to a range of from 1.5:1 to 5:1. When the solution is to be spray dried, it is preferable to add sufficient magnesium dichloride to increase the Mg/Ti ratio to a range of from 1.5:1 to 15:1, most preferably to a range of from 4:1 to 6:1.

Dissolution of magnesium dichloride can be effected by stirring it in the electron donor solution at a temperature of from 0 to 200° C. Temperatures that are hotter than the boiling point of the electron donor compound may be utilized, however this requires the use of equipment capable of withstanding elevated pressures, and for this reason is generally not preferred. Magnesium dichloride more readily dissolves in the electron donor compound in the presence of titanium tetrachloride than in the presence of titanium trichloride. Thus, in those instances when the titanium tetrachloride is to be reduced to titanium trichloride by adding the magnesium metal to a solution of the titanium tetrachloride in the electron donor compound, it may be preferable to dissolve both the magnesium dichloride and the titanium tetrachloride in the electron donor compound before the magnesium metal is added. The magnesium dichloride can, of course, also be dissolved in a mixture of the magnesium metal and electron donor compound before the titanium tetrachloride is added to the mixture, if desired.

The solution of titanium trichloride and magnesium dichloride prepared in this manner can be spray dried as is, however the particles thus formed are typically brittle and exhibit insufficient mechanical strength leading to increased levels of fines. It is thought that these particles are relatively brittle due to the highly crystalline nature of the solids formed. It is preferable to either deposit the precursor solution on a porous catalyst support or instead add to the solution a filler which, on subsequent spray drying, provides additional mechanical strength to the particles.

When the precursor solution is deposited on a porous support, the support chosen is inert, that is, it does not affect the polymerization reaction in itself. However, when the precursor is deposited on the surface of a support having a large surface, the monomer molecules are more readily polymerized. The support is either an organic compound (for example a polymer) or an inorganic compound, such as a metal oxide. Suitable inorganic compounds include, for example, silicon dioxide, aluminum oxide. Ti-, Mg-, Cr-, Ba-, Th- and Zr-oxides, silicates, aluminophophates, and mixtures of alumina and aluminum phosphate (phosphated alumina). The inorganic support can also be a metal hydroxide or a metal hydroxy halide. Combinations of various supports are possible, as well. The amount of support used to form the catalyst precursor ranges from 50 to 90, preferably from 70 to 85 percent of the total catalyst precursor. The support should also be chosen such that the precursor solution prior to drying is contained substantially entirely within the pores of the support and is deposited therein by precipitation during the drying step.

Alternatively, and more preferably, spray drying may be effected by i) admixing the precursor solution with said filler; ii) optionally heating the resulting slurry to a temperature as high as the boiling point of the electron donor compound; and iii) then atomizing the slurry by means of a suitable atomizing device to form discrete spherically shaped particles. Atomization is effected by passing the slurry through the atomizer together with an inert drying gas, that is, a gas that is non-reactive under the conditions employed during atomization. An atomizing nozzle or a centrifugal high-speed rotary atomizer can be employed to effect atomization. The volumetric flow of drying gas must considerably exceed the volumetric flow of the slurry to effect atomization of the slurry and removal of excess electron donor compound. Ordinarily the drying gas is heated to a temperature greater than the boiling point of the electron donor compound up to as high as 200° C. to facilitate removal of excess electron donor compound. However, if the volumetric flow of drying gas is maintained at a very high level or if reduced pressures in the spray drying apparatus are employed, lower temperatures may be used.

Any solid particulate material that is inert to the other components of the catalyst system, and during subsequent polymerization, can be employed as filler for the solution of titanium trichloride and magnesium dichloride to form a slurry suitable for spray drying. Such materials can be organic or inorganic. Suitable fillers include silica, titanium dioxide, alumina, aluminophosphates, talc, polystyrene, and calcium carbonate. Fumed hydrophobic silica is preferred because it imparts high viscosity to the feed slurry, is inert in the final product, and provides good strength to the spray dried particles. An example of such a hydrophobic fumed silica includes Cab-O-Sil™, available from the Cabot Corporation.

The particulate material employed as filler should have an average particle size no greater than 10 μm, preferably no greater than 1 μm. Like the particulate materials employed when the solution of titanium trichloride and magnesium dichloride is impregnated into a support, the particulate material employed as filler should be substantially free of absorbed water and unreactive with the remaining catalyst components. Filler compounds which are soluble in the electron donor solvent may also be used. Examples include $CaCl_2$, polyvinylchloride, polystyrene, interpolymers of styrene and ethylene, and acrylic polymers. Soluble and insoluble fillers may be used separately or in mixture. When used in a mixture, the weight ratio of soluble filler:insoluble filler is preferably from 0.05:1 to 1:1.

When an insoluble filler is used, sufficient filler should be admixed with the solution of titanium trichloride and magnesium dichloride to produce a slurry suitable for spray drying, that is, a slurry containing such filler in an amount of from 0 to 15, preferably from 2.5 to 10 percent by weight. When spray dried, such slurry produces discrete particles in which filler is present in an amount of from 0 to 50, preferably from 10 to 50 percent by weight, most preferably 15 to 30 percent by weight. The spray dried particles desirably have an average particle size of from 5 to 200 μm, preferably from 15 to 50 μm Spray drying is effected using any suitable apparatus known in the art. Due to the particle size desired, rotary atomization is the preferred method to convert the feed slurry into droplets for drying. A co-current drying chamber is preferably employed in which the aspect ratio (H/D) is between 0.8 and 3.0, preferably near 1.0. A closed cycle spray dryer system is also preferred for use if flammable electron donors or other components are employed.

The spray dried catalyst precursor is then preferentially placed into mineral oil slurry. The mineral oil used for the formation of the slurry can be any essentially air and moisture free aliphatic or aromatic hydrocarbon, preferably an aliphatic hydrocarbon, which is unreactive with the catalyst precursor composition, the activator, and the cocatalyst. Suitable diluents include hydrogenated mineral oils, including aliphatic or naphthenic oils of relatively high viscosity to minimize settling of catalyst solids in feed tubes, although, with appropriate engineering design, lower viscosity diluents such as isopentane, hexane, and heptane can be used as well. Preferred diluents are aliphatic or napthenic hydrocarbons with viscosity greater than 50 centipoise (cP) particularly greater than 70 cP and less than 5,000 cP, as measured by a Brookfield viscometer at a shear rate of 1 $sec^{-1}$ at 25° C. The viscosity of the diluent is sufficiently low so that the slurry can be conveniently pumped through the pre-activation apparatus and eventually into the polymerization reactor, using a slurry catalyst feeder. Progressive cavity pumps for large volume flows and dual piston syringe pumps, where the catalyst flows are $\leq 10$ cm$^3$/hour of slurry, are suitably employed. Particularly preferred diluents are food grade mineral oils, exemplified by Kaydo™ 350 and Hydrobrite™ 380, 550 and 1000, available from Witco Corporation.

Pre-Activation of the Catalyst Precursor

Prior to its introduction into the reactor, the catalyst precursor is contacted with a Lewis acid activator. The Lewis acid activator can be one compound or a mixture of two or more different compounds. Preferred Lewis acids are those of the formula M'(R"$_n$)X$_{(3-n)}$ wherein M' is aluminum or boron; each X is independently chlorine, bromine, or iodine; each R" is independently a saturated aliphatic hydrocarbon radical having 1 to 14 carbon atoms, provided that when M' is aluminum, n is 1 to 3 and when M' is boron, n is 0 to 1.5. Examples of suitable R" groups are methyl, ethyl, n-butyl, isobutyl, n-hexyl, n octyl, n-decyl, and n-dodecyl. Particularly preferred Lewis acids include trimethyl aluminum, triethyl aluminum, tri-isopropyl aluminum, tri-n-hexyl aluminum, tri-n-octyl aluminum, dimethyl aluminum chloride, and diethyl aluminum chloride.

If a single Lewis acid activator is used, it is preferably a trialkylaluminum compound, especially triethylaluminum, tri-n-butyl aluminum, tri-n-hexyl aluminum, tri-n-octyl aluminum, tri n-decyl aluminum, and mixtures thereof. When a mixture of two activator compounds is used, the compounds are desirably employed in molar ratios (activator compound 1:activator compound 2) from 6:1 to 1:1. Particularly preferred activator compounds are sequential mixtures of tri-ethylaluminum or tri-n-hexylaluminum (activator compound 1) with diethylaluminum chloride (activator compound 2), or sequential mixtures of diethylaluminum chloride (activator compound 1) with triethylaluminum or tri-n-hexylaluminum (activator compound 2).

The mole ratio of total precursor activator to the electron donor in the precursor if partial pre-activation is desired can be within the range of 0.1:1 to 1:1, preferably from 0.1:1 to 0.75:1, more preferably from 0.1:1 to 0.3:1.

By the term "sequential" is meant that the second activator is not contacted with the precursor until after contact with the first activator occurs, and preferably after a delay of from 10 to 60 minutes. Preactivation may be conducted in a batch process or in an in-line process, and is preferably performed in an in-line fashion in which the catalyst precursor is fully or partially activated during the period in which it is being conveyed to the reactor. In a preferred mode, (sometimes referred to as an in-line activation system), the precursor slurry is passed through an optional static mixer to homogenize the slurry and then past an activator injection port where activator is added. The mixture then passes through a mixer for thorough incorporation of activator. If a second activator is employed the process may be repeated until the partially or fully activated catalyst mixture is injected into the reactor.

The mixers are preferably static mixers, however any suitable mixing means may be employed. Optionally, a vessel or a length of connecting pipe maybe provided to give an additional retention time prior to injection into the polymerization reactor. In a desirable embodiment, the partially or fully activated catalyst precursor is passed in a substantially plug-flow stream through any vessels, mixers and connecting pipes or other devices in order to provide uniformly activated precursor composition to the reactor. This in-line modification has the added advantage of minimizing storage time of the partially or fully activated catalyst and allowing for direct control in real time of the amount of activator used, resulting in improved control of catalyst productivity. Short residence times combined with higher concentration of reagents used in the activation results in improved catalyst and polymer properties, since catalyst deactivation is minimized due to the short (typically 1 minute to 6 hours) time the precursor is in contact with the activator.

The static mixer, where employed, is preferably mounted vertically, with the direction of flow being either up or down, to prevent solids accumulation in the mixer. A suitable static mixer for use herein comprises 32 mixing elements within a 0.5 inch (12.5 mm) diameter jacket having an overall length is 25 inches (63 cm). The static mixer element should be located downstream of the point where activator is injected into the precursor slurry. There is no requirement that the mixer element be within a certain minimum distance of the injection point. Distances from 1 to 1000 cm are acceptable depending on the overall system layout and dimensions.

Static mixers function by repeatedly dividing a fluid stream passing over the mixing elements and optionally reversing the direction of flow over a small distance. Depending on the activator used, the viscosity of the precursor slurry, the temperature of the slurry, and other process conditions, a shorter or longer reaction period may be required for activation of the catalyst precursor. For this purpose a suitable residence time can be introduced into the activation process either by use of a suitable vessel or, where plug-flow of the slurry is desired, an additional length of feed pipe or an essentially plug flow holding vessel. A residence time zone providing an increased holding time for the partially activated precursor can be used with both activators, for only one activator, or for neither activator.

A preferred mode for carrying out the foregoing partial or complete activation in-line is shown schematically in FIG. 1. In the FIGURE, the procatalyst is introduced into a slurry feed tank 10; equipped with a pump 11 for conveying the slurry to the reactor 40. The slurry passes to a first reaction zone 12, immediately downstream of an activator injection port 14 where the (first) activator 16, is added. Optionally, the mixture then passes to a second reaction zone 22 immediately downstream of a second activator injection port 24 where a second activator 26, may be added in a second reaction zone 22, if desired.

Each reaction zone is equipped with static mixers 20 and 28 respectively. Depending on the activator compound used, some reaction time may be required for the reaction of the activator compound with the catalyst precursor. This is conveniently done using a residence time zone 44, which can consist either of an additional length of slurry feed pipe or an essentially plug flow holding vessel. Cocatalyst or additional activator, is supplied from cocatalyst supply tank 46 to the slurry prior to charging to the reactor. If desired, additional cocatalyst may be supplied to the reactor (not depicted). The reactor 40 is preferably a single, continuous gas-phase reactor or continuous, dual, gas-phase reactors operating in series.

Due to the high viscosity of the slurry, poor heat transfer can result in temperature excursion and loss of activity during activation. Depending on the catalyst precursor, degradation can start to occur at temperatures of 60° C. or higher. Accordingly, full or partial activation according to the present invention is desirably conducted at temperatures in the range from 10 to 60° C., preferably from 30 to 45° C. Adequate mixing is desired in order to maintain relatively constant temperatures and prevent localized catalyst decomposition due to temperature excursion.

To assure that a uniformly pre-activated catalyst precursor is supplied to the reactor, flow through the various mixing devices and the connecting piping should be as close to plug flow as possible. In this regard, axial mixing and the use of residence time pots should be minimized by maintaining a high aspect ratio in the supply tubes. A preferred L/D (length to diameter ratio) is in the range from 5 to 15. This results in a low velocity flow and minimal back mixing due to velocity gradients in laminar flow.

After activator has been added to the catalyst precursor slurry in one or more steps, the partially activated catalyst is then added to the polymerization reactor where final activation by the cocatalyst occurs. Partial activation is achieved primarily by use of less than stoichiometric amounts of the activator or by amounts that are determined empirically to result in incomplete activation. The remaining activator (cocatalyst), if employed, may be added to the partially activated catalyst precursor as a last step prior to entry into the reactor, or through addition to the polymerization reactor(s) or their associated components.

In a preferred embodiment of the invention, the final addition of activator occurs within 30 minutes and preferably within less than 15 minutes of injection of the catalyst slurry to the reactor followed by thorough mixing and continuous plug-flow of the catalyst mixture thereafter to produce a homogeneous activated catalyst mixture. The composition of the final catalyst slurry, that is the amount of catalyst+the amount of mineral oil diluent, is adjusted such that the final slurry viscosity is at least 1000 cP, preferably at least 1500 Cp as measured by a Brookfield viscometer at a shear rate of 1 $sec^{-1}$ at 25° C. This results in reduced catalyst settling or deposit from the slurry, especially after activation. The use of the foregoing in-line plug-flow introduction of activated or partially activated catalyst precursor into a reactor, especially a continuous, gas-phase polymerization reactor operating under olefin polymerization conditions, results in uniform catalyst properties and polymerization activity.

Complete Activation by Addition of Cocatalyst

Complete activation of the precursor by contact with activator or cocatalyst is required to achieve full activity. Suitable cocatalysts are reducing agents that are conventionally employed and known in the art, including the previously disclosed compounds used for partial activation. Examples include hydrides, halides, and organometal derivatives of sodium, lithium, potassium, magnesium, zinc and aluminum. Conventionally, the cocatalysts are selected from the group comprising aluminum trialkyls, aluminum alkyl halides, aluminum alkoxides, aluminum alkyl alkoxides, and aluminum alkoxy halides. In particular, aluminum trialkyl- and aluminum dialkyl chloride-compounds are used. These compounds are exemplified by trimethyl aluminum, triethyl aluminum, tri-isobutyl aluminum, tri-n-hexyl aluminum, dimethyl aluminum chloride, diethyl aluminum chloride, diisobutyl aluminum chloride, and di-n-butylaluminum chloride. Butyl lithium and dibutyl magnesium are examples of useful compounds of other metals.

Polymerization

In a single reactor configuration, the entire catalyst composition, which includes the partially activated precursor and the cocatalyst, is added to the reactor. Alternatively, some or all of the co-catalyst may be added to the reactor itself or to the recycle assembly comprising the reactor system. In a dual reactor configuration, the reaction mixture including the previously activated catalyst along with unreacted monomers and/or the copolymer or homopolymer produced in the first reactor, is transferred to the second reactor. Additional quantities of partially or fully activated catalyst and/or the same or a different cocatalyst may be added to the reaction mixture in the second reactor or to the reaction mixture charged thereto, if desired.

The polymerization in each reactor is desirably conducted in the gas phase using a continuous fluidized bed process. A typical fluidized bed reactor can be described as follows. The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, that is, comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, and elsewhere.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the addition of cocatalyst. Changing the molar ratios of the comonomers introduced into the fluidized bed can vary the product composition. The product is continuously discharged in granular or particulate form from the reactor as the bed level builds up with polymerization. Adjusting the catalyst feed rate and/or the ethylene partial pressures in both reactors controls the production rate.

The hydrogen:ethylene mole ratio can be adjusted to control average molecular weights of the polymer product. The alpha-olefins other than ethylene, if used, can be present in a total amount of up to 15 percent by weight of the copolymer and, if used, are preferably included in the copolymer in a total amount from 0.1 to 10 percent based on total polymer weight. The quantity of such α-olefin can be adjusted to control the density of the final product.

The residence time of the mixture of reactants including gaseous and liquid reactants, catalyst, and resin in each fluidized bed can be in the range of 1 to 12 hours and is preferably in the range of 1.5 to 5 hours. Either or both of the reactors of a dual reactor system can be operated in condensing mode, as is described in U.S. Pat. Nos. 4,543,399; 4,588,790; and 5,352,749, if desired.

In a dual reactor configuration, a relatively low melt index or flow index (or high molecular weight) copolymer is usually prepared in the first reactor. The mixture of polymer, unreacted monomer, and activated catalyst is preferably transferred from the first reactor to the second reactor via an intercommunicating conduit using nitrogen or reactor recycle gas as a transfer medium. Alternatively, the low molecular weight copolymer can be prepared in the first reactor and the high molecular weight copolymer can be prepared in the second reactor.

Regardless of the reactor employed, for production of a high molecular weight product, the mole ratio of alpha-olefin to ethylene is desirably in the range from 0.01:1 to 0.8:1, preferably from 0.02:1 to 0.35:1. The mole ratio of hydrogen to ethylene is desirably in the range of 0:1 to 0.3:1, and preferably from 0.01 to 0.2:1. Preferred operating temperatures vary depending on the density desired, with lower temperatures being employed for lower densities and higher temperatures for higher densities. Suitable operating temperature is from 70 to 110° C.

For production of a low molecular weight product, the mole ratio of alpha-olefin to ethylene generally is in the range from 0:1 to 0.6:1, preferably from 0.001:1 to 0.42:1. The mole ratio of hydrogen to ethylene can be in the range of 0:1 to 3:1, and is preferably in the range of 0.5:1 to 2.2:1. The operating temperature is generally in the range of 70 to 110° C. The operating temperature is preferably varied with the desired density to avoid product stickiness in the reactor.

The weight ratio of polymer prepared in the high molecular weight reactor to polymer prepared in the low molecular weight reactor (referred to as "split") desirably ranges from 30:70 to 80:20, and is preferably in the range of 40:60 to 65:35.

The transition metal based catalyst system including the cocatalyst, ethylene, alpha-olefin, and, optionally, hydrogen are continuously fed into the first reactor, the polymer/active catalyst mixture is continuously transferred from the first reactor to the second reactor; ethylene and, optionally, alpha-olefin and hydrogen, and cocatalyst are continuously fed to the second reactor. The final product is continuously removed from the second reactor. A preferred mode is to take batch quantities of product from the first reactor, and transfer these to the second reactor using the differential pressure generated by the recycle gas compression system. A system similar to that described in U.S. Pat. No. 4,621,952, is particularly useful in this regard.

The pressure may be the same or different in the first and second reactors. Depending on the specific method used to transfer the reaction mixture or polymer from the first reactor to the second reactor, the second reactor pressure may be either higher than or somewhat lower than that of the first. If the second reactor pressure is lower, this pressure differential can be used to facilitate transfer of the polymer/catalyst mixture from Reactor 1 to Reactor 2. If the second reactor pressure is higher, the differential pressure across the cycle gas compressor may be used as the motive force to move the reaction mixture. The pressure, that is, the total pressure in the reactors, can be in the range of 200 to 500 psig (1.5-3.6 MPa) and is preferably in the range of 250 to 450 psig (1.8-3.2 MPa). The ethylene partial pressure in the first reactor can be in the range of 10 to 150 psig (170-1,100 kPa), and is preferably in the range of 20 to 80 psig (240-650 kPa). The ethylene partial pressure in the second reactor is set according to the amount of (co)polymer desired to be produced in this reactor to achieve the split mentioned above. Increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent, for example, isopentane or hexane, also contribute to the overall pressure in the reactor according to their vapor pressure under the temperature and pressure experienced in the reactor.

Desirably according to the present invention, the mole ratio of activator to the electron donor in the precursor employed for partial activation in the pre-activation step (5) is within the range of 0.1:1 to 1:1, preferably from 0.1:1 to 0.75:1, more preferably from 0.1:1 to 0.3:1. The mole ratio of activator to the transition metal in the precursor employed in partial activation in the pre-activation step (5) desirably is within the range of 0.25:1 to 20:1, preferably from 0.5:1 to 10:1, more preferably from 0.5:1 to 5:1.

By the time of the final polymerization step, the total mole ratio of all activator and cocatalyst employed in the present process to electron donor is desirably in the range of 2:1 to 50:1, preferably from 3:1 to 20:1, more preferably from 3:1 to 15:1. The mole ratio of total activator compound and cocatalyst employed in the present process to transition metal is preferably from 10:1 to 200:1, more preferably from 20:1 to 100:1, most preferably from 20:1 to 50:1.

The process of the present invention unexpectedly results in a decrease in the amount of fines in the resulting polymer, in particular a reduction in the level of fines particles of less than 125 μm in particle size. The quantity of fines in the resulting product is at least 10 percent, preferably at least 25 percent, more preferably at least 35 percent less than the quantity of fines in a polymer produced under the same conditions but without partial or complete pre-activation according to the present invention.

Although not wishing to be bound by any theory or hypothesis, the foregoing benefit of reduced polymer fines generation according to the present invention is believe to be due to one or more of several possible mechanisms:

1. Preactivation produces smaller catalyst particles that are already fully activated or more easily activated upon entry into the reactor due to their higher surface/volume ratio leading to a higher activator/electron donor ratio or activator/titanium compound ratio. This leads to more rapid initiation of polymerization and a longer period of growth within the reactor leading to larger polymer particle size.
2. Preactivation results in higher concentration of activator/precursor in the preactivation stage. The preactivated particles are more uniformly advanced towards full activation, reducing any induction period and increasing the catalyst activity/time profile. This results in greater heat release per particle generating faster clumping and greater structural integrity of catalyst/polymer particles and reduced exposure of catalyst and polymer particles to abrasion forces.
3. Preactivation results in modification of surface of the catalyst precursor particles causing the smaller particles to better adhere to larger polymer particles, resulting in lower fines levels.

EXAMPLES

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis. The term "overnight", if used, refers to a time of approximately 16-18 hours, the term "room temperature", refers to a temperature of 20-25° C., and the term "$C_2H_4PP$" refers to ethylene partial pressure. In the event the name of a compound herein does not conform to the structural representation thereof, the structural representation shall control.

Test Methods

Residual Ti concentration means the titanium values in a polymer sample expressed in part per million (ppm), determined using X-ray Fluorescence on a plaque prepared according ASTM D1928, Condition C. Because residual titanium originates solely from any catalyst residue in the polymer, it is a measure of catalyst productivity. More productive catalysts result in lower residual titanium concentrations in the polymer.

The term "Melt Index" if used herein is used interchangeably with the term "I2" and is determined under ASTM D-1238, measured at 190° C. and 2.16 kilograms and reported as grams per 10 minutes or decigrams per minute.

The term "Flow Index", "FI" or "I21" if used herein is determined according to ASTM D-1238, measured at 190° C. and 21.6 kilograms and reported as grams per 10 minutes or decigrams per minute.

The term "Melt Flow Ratio" if used herein is the ratio of Flow Index to Melt Index.

Polymer density is measured using ASTM D1928 Condition C for plaque preparation and ASTM Method 792D for density measurement.

The terms "D10", "D50" and "D90" as used herein indicate particular percentiles of the log normal particle size distribution of a sample determined by means of a Coulter particle size analyzer using dodecane diluent and represent the particle diameter corresponding to the $10^{th}$, $50^{th}$ and $90^{th}$ percentiles respectively of said distribution.

Preparation of Catalyst Precursor

A titanium trichloride catalyst precursor is prepared in an approximately 7,500 liter glass lined vessel equipped with pressure and temperature control, and a turbine agitator. A nitrogen atmosphere (<5 ppm $H_2O$) is maintained at all times. Tetrahydrofuran (10,500 lbs, 4,800 kg, <400 ppm $H_2O$) are added to the vessel. The tetrahydrofuran is recovered from a closed cycle dryer and contained approximately 0.1 percent Mg and 0.3 percent Ti. An 11 percent THF solution of triethylaluminum (187 lbs, 85 kg) is added to scavenge residual water. The reactor contents are heated to 40° C., and 13.7 lbs (6 kg) of granular magnesium metal (particle size 0.1-4 mm) is added, followed by 214.5 lbs (97.3 kg) of titanium tetrachloride added over a period of one-half hour.

The mixture is continuously agitated. The exotherm resulting from the addition of titanium tetrachloride causes the temperature of the mixture to rise to approximately 44° C. The temperature is then raised to 70° C. and held at that temperature for approximately four hours, then cooled to 50° C. At the end of this time, 522 pounds (238 kg) of magnesium dichloride are added and heating initiated to raise the temperature to 70° C. The mixture is held at this temperature for another five hours, then cooled to 35° C. and filtered through a 100 mesh (150 μm) filter to remove solids.

Fumed silica (CAB-O-SIL™ TS-610, manufactured by the Cabot Corporation) (811 lbs, 368 kg) is added to the above precursor solution over a period of one hour. The mixture is stirred by means of a turbine agitator during this time and for 4 hours thereafter to thoroughly disperse the silica. The temperature of the mixture is held at 40° C. throughout this period and a dry nitrogen atmosphere is maintained at all times. The resulting slurry is spray dried using an 8-foot diameter closed cycle spray dryer equipped with a rotary atomizer. The rotary atomizer is adjusted to give catalyst particles with a D50 on the order of 20-30 μm. The scrubber section of the spray dryer is maintained at approximately +5 to −5° C.

Nitrogen gas is introduced into the spray dryer at an inlet temperature of 140 to 165° C. and is circulated at a rate of approximately 1000-1800 kg/hour. The catalyst slurry is fed to the spray dryer at a temperature of 35° C. and a rate of 65-150 kg/hour, or sufficient to yield an outlet gas temperature in the range of 100-125° C. The atomization pressure is maintained at slightly above atmospheric. The resulting catalyst particles are mixed with mineral oil (Kaydol™ 350, available from Witco Corporation) under a nitrogen atmosphere in a 400 liter glass lined vessel equipped with a turbine agitator to form a slurry containing approximately 28 percent of the catalyst precursor.

Catalyst Precursor Partial Pre-activation

The mineral oil slurry of precursor is partially activated by contact at room temperature with a 30 percent mineral oil solution of diethylaluminum chloride (DEAC), a 50 percent mineral oil solution of tri-n-hexyl aluminum (TNA), or a sequential mixture of both activators. The catalyst precursor slurry is added to a mixing vessel at room temperature in an amount less than a stoichiometric amount based on Lewis base present in the precursor. An appropriate amount of activator is added while stirring. If both activators are used, the DEAC solution is added first, and the slurry is stirred for one hour followed by addition of the TNA solution, followed by stirring for another two hours. If only DEAC or TNA activator is used, addition is followed by stirring for at least one hour prior to use. Following partial activation the slurry containing the partially activated precursor is retained at room temperature prior to use.

Examples 1 and 2, Comparative 1

A single, gas-phase polymerization reactor operating at 80° C. is used to produce a high molecular weight ethylene/1-hexene copolymer product. The reactor has a 14 inch (36 cm) diameter cylindrical reactor, a nominal 5 to 6 foot (1.5-1.8 m) bed height, and a fluidization gas velocity of 2 feet/sec (0.6 m/s). Comonomer content is controlled to produce equivalent density polymers. Triethylaluminum (TEAL) cocatalyst is added to the recycle gas in the form of a isopentane solution. Polymer fines are determined based on the quantity of a sample passing through a 120 mesh (125 μm hole size) screen. The geometric mean was used to calculate the average particle size. Results are shown in Table 1.

TABLE 1

| Catalyst | Comp. 1*<br>No<br>preactivation | Example - 1<br>TNA partial<br>activation | Example - 2<br>TNA/DEAC<br>partial activation |
|---|---|---|---|
| Precursor Size D50 | 23 | 23 | 23 |
| Precursor Size D10 | 8 | 8 | 8 |
| Mole Ratio Activator/THF | 0 | 0.17 | 0.2 (TNA),<br>0.45 (DEAC) |
| Mole Ratio Cocatalyst/THF | 5.64 | 6.62 | 6.87 |
| $C_2H_4$ PP psi (kPa) | 38.4 (265) | 35 (241) | 35 (241) |
| Residence Time [hr] | 3.1 | 3 | 3.3 |
| FI (I21) [dg/min] | 0.39 | 0.37 | 0.38 |
| Density [g/cc] | 0.933 | 0.932 | 0.931 |
| Comonomer (percent)** | 2.25 | 2.4 | 2.6 |
| Fines [wt %] | 3.81 | 1.87 | 3.33 |
| Residual Ti [ppm] | 2.88 | 2.77 | 4.46 |

*comparative, not an example of the invention
**comonomer content in polymer

Examples 1 and 2 demonstrate reduced fines generation with respect to the comparative polymerization. Productivity of the catalyst of Example 1 as measured by residual Ti is also better than the productivity of comparative 1, but the productivity of Example 2 is inferior to that of comparative 1.

Example 3, Comparative 2

The precursor partial activation procedure of Example 1 (TNA activator, 0.17 Al/THF molar ratio) is substantially repeated in combination with a dual reactor gas phase polymerization process having two essentially similar reactors operating in series. The cocatalyst in all polymerizations is TEAL. Copolymer product from the first reactor is charged to the second reactor along with additional TEAL cocatalyst and ethylene monomer. Results are contained in Table 2.

TABLE 2

| | Comparative 2* | | Example 3 | |
|---|---|---|---|---|
| Catalyst | $1^{st}$<br>Reactor<br>unactivated | $2^{nd}$<br>Reactor | $1^{st}$<br>Reactor<br>Partially Activated | $2^{nd}$<br>Reactor |
| Mole Ratio Cocatalyst/THF | 5.89 | 6.62 | 6.75 | 7.73 |
| $C_2H_4$ PP (psi) (kPa) | 32.3 (223) | 100 (690) | 35.6 (245) | 102 (703) |
| Residence Time [hr] | 3.2 | 2.5 | 3.2 | 2.6 |
| FI [dg/min] | 0.7 | 27 | 0.7 | 28 |
| Density [g/cc] | 0.934 | 0.956 | 0.934 | 0.956 |

TABLE 2-continued

| | Comparative 2* | | Example 3 | |
|---|---|---|---|---|
| Catalyst | 1st Reactor unactivated | 2nd Reactor | 1st Reactor Partially Activated | 2nd Reactor |
| Comonomer Percent** | 2.25 | | 2.25 | |
| Fines [percent] | 2.34 | 3.11 | 2.06 | 2.64 |
| Residual Ti [ppm] | 3.14 | 1.58 | 3.25 | 1.44 |

*Comparative, not an example of the invention
**Comonomer content of polymer

The results of Example 3 again demonstrate a reduction in polymer fines in the polymer product produced in both the first and second reactors. Residual titanium values are higher after the first reactor (indicating reduced productivity) but are reduced after completion of polymerization in both reactors.

Examples 4, 5 and Comparative 3, 4

Another series of dual reactor mode experiments are performed using TNA as the precursor activator. In Example 5, in-line pre-activation is employed according to the following procedure. A 2-foot (610 mm) 32-element static mixer having 32 mixing elements, a 0.5 inch (12.5 mm) inside diameter, and an overall length is 25 inches (63 cm) (available from Kenics Corp.) is mounted vertically with a direction of flow downward. An activator injection point in the pipe is provided just prior to the static mixer and an up-flow, plug flow accumulator is interposed after the mixer to provide a residence time of approximately 15 to 45 minutes prior to injection into the reactor. TNA activator (50 percent in mineral oil) is injected into the transfer line prior to the static mixer. All connections and piping are of stainless steel tubing of 0.5 inch (12.5 mm) inside diameter. The results of the polymerizations are summarized in Table 3.

TABLE 3

| | Comp. 3* | | Example 4 | | Comp. 4* | | Example 5 | |
|---|---|---|---|---|---|---|---|---|
| | Reactor | | | | | | | |
| Catalyst | 1st No activation | 2nd | 1st Partial activation | 2nd | 1st No activation | 2nd | 1st Partial activation | 2nd |
| C$_2$H$_5$ PP psi (kPa) | 35.6 (245) | 117 (807) | 37.1 (256) | 124 (855) | 39 (269) | 91 (627) | 38 (262) | 105 (724) |
| Residence Time [hr] | 3 | 2.2 | 3.2 | 2.2 | 2.1 | 2.1 | 2.4 | 2.3 |
| FI [dg/min] | 0.42 | 27 | 0.43 | 27 | 0.76 | 16 | 0.7 | 29 |
| Density (g/cc) | 0.934 | 0.956 | 0.934 | 0.956 | 0.926 | 0.946 | 0.932 | 0.954 |
| Comonomer Percent** | 2.1 | | 2.1 | | 4.0 | | 2.6 | |
| Fines [percent] | 2.02 | 2.1 | 2.03 | 1.82 | 4.5 | 5.2 | 2.3 | 3.5 |
| Residual Ti [ppm] | 2.8 | 1.3 | 2.8 | 1.3 | 2.1 | 1.2 | 3.5 | 1.6 |
| Mole Ratio Cocatalyst/THF | 5.40 | 6.38 | 6.75 | 7.36 | 4.30 | 6.13 | 4.30 | 6.13 |

*Comparative, not an example of the invention
**Comonomer content of polymer

Polymer fines in the product exiting the final reactor of Examples 4 and 5 decrease by 13 and 33 percent compared to Comparatives 3 and 4 respectively. This result is remarkable considering the fact that the product formed in the 2$^{nd}$ reactor is of a much higher density and lower molecular weight than the final product and the product of the first reactor and inherently more subject to fractionation and fines generation compared to a lower density product. In Example 5 the final polymer density is also higher than the final polymer density of the product made in comparative 4, making the reduction in fines generation even more remarkable.

The invention claimed is:
1. A gas phase olefin polymerization process comprising:
(1) preparing a solution of a catalyst precursor comprising a mixture of magnesium and titanium compounds, an electron donor and a solvent;
(2) adding a filler to the solution from step (1) to form a slurry;
(3) spray drying the slurry from step (2) at a temperature of 100 to 140° C. to form a spray dried precursor;
(4) slurrying the spray dried precursor from step (3) in mineral oil,
(5) partially pre-activating the catalyst precursor by contacting the slurry of step (4) with one or more Lewis Acids employing one or more in-line static mixers, wherein the molar ratio of the Lewis Acid tote electron donor in the catalyst precursor is about 0.1:1 to about 0.3:1; and
(6) transferring the partially pre-activated catalyst precursor from step (5) under plug-flow conditions into a gas phase, olefin polymerization reactor, and adding an additional amount of the activator to the reactor in an amount sufficient to produce a homogeneous activated catalyst mixture, wherein the molar ratio of the Lewis Acid to the electron donor after the additional amount of activator is added is about 2:1 to about 50:1, and wherein the catalyst is partially pre-activated in step (5) for a short residence time to minimize deactivation of the catalyst of about 1 minute to about 6 hours prior to the transferring step (6).

2. The gas phase olefin polymerization process of claim 1, wherein the filler comprises a porous catalyst support.

3. The process of claim 1 wherein;
1) the catalyst precursor in step (1) corresponds to the formula:

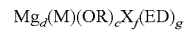

$$Mg_d(M)(OR)_eX_f(ED)_g$$

wherein R is an aliphatic or aromatic hydrocarbon radical having 1 to 14 carbon atoms or COR' wherein R' is a aliphatic or aromatic hydrocarbon radical having 1 to 14 carbon atoms and each OR group is the same or different;
M is a transition metal;
X is independently chlorine, bromine or iodine;
ED is an electron donor;
d is 0.5 to 56;
e is 0, 1, or 2;
f is 2 to 116;
g is >2 and up to 1.5(d)+3; and 2) the Lewis Acid of step (5) is
  i) one or more compounds with formula $M'(R''_n)X_{(3-n)}$ wherein M' is aluminum or boron; each X is independently chlorine, bromine, or iodine; each R" is independently a saturated aliphatic hydrocarbon radical having 1 to 14 carbon atoms, provided that when M is aluminum, n is 1 to 3 and when M is boron, n is 0 to 1.5; and
  ii) is added in an amount such that the mole ratio of total Lewis Acid to electron donor in the precursor is from about 0.1:1 to about 0.3:1.

4. The process of claim 1 wherein said Lewis Acid is;
  one or more alkylaluminum compound(s) with formula $M'(R''_n)X_{(3-n)}$ wherein M' is aluminum, R" is n-butyl, n-hexyl, n-octyl, iso-octyl, isohexyl, or n-decyl, X is Cl or Br and n is a number from 0 to 1.5.

5. The process of claim 4, wherein said Lewis Acid is selected from the group consisting of triethylaluminum, tri-n-butyl aluminum, tri-n-hexyl aluminum, tri-n-octyl aluminum, tri n-decyl aluminum, triisoprenyl aluminum, dimethyl aluminum chloride, ethylaluminum dichloride, diethylaluminum chloride, and mixtures thereof.

6. The process of claim 1, wherein the catalyst precursor is partially preactivated by first contacting with diethylaluminum chloride followed by tri-n-hexyl aluminum.

7. The process of claim 1, wherein the viscosity of the slurry after addition of the activator or activators in step (5) is adjusted to at least 1500 cP.

8. The process of claim 1 in which the slurry of step (4) is intimately mixed with the Lewis Acid in step (5) by use of one or more vertically disposed static mixers.

9. The process of claim 1 wherein the one or more static mixers and connecting piping have length/diameter ratios from 5 to 15.

10. The process of claim 1 in which said gas phase reactor is the sole olefin polymerization reactor.

11. The process of claim 1 wherein two olefin polymerization reactors are employed.

12. The process of claim 1, wherein the activator includes a Lewis Acid having the formula $M'(R''_n)X_{(3-n)}$ wherein
  M' is aluminum;
  each X is independently chlorine, bromine, or iodine;
  each R" is independently a saturated aliphatic hydrocarbon radical having 1 to 14 carbon atoms; and
  n is 1 to 3; and
  wherein the catalyst is partially pre-activated in step (5) for about 15 minutes to about 45 minutes prior to the transferring step (6).

13. The process of claim 1, wherein a polymer comprising ethylene produced according to the process of claim 1 has a quantity of fines that is at least 10 percent less than the quantity of fines in a polymer produced under a comparative process under the same conditions except that the comparative process does not include the partial pre-activation of the catalyst precursor according to step (5) of the process of claim 1.

14. A gas phase olefin polymerization process comprising:
  (1) preparing a solution of a catalyst precursor comprising a mixture of magnesium and titanium compounds, an electron donor and a solvent;
  (2) adding a filler to the solution from step (1) to form a slurry;
  (3) spray drying the slurry from step (2) at a temperature of 100 to 140° C. to form a spray dried precursor;
  (4) slurrying the spray dried precursor from step (3) in mineral oil,
  (5) partially pre-activating the catalyst precursor by contacting the slurry of step (4) with one or more Lewis Acids employing one or more in-line static mixers; wherein the molar ratio of the Lewis Acid to the electron donor in the catalyst precursor is about 0.1:1 to about 0.3:1; and
  (6) transferring the partially pre-activated catalyst precursor from step (5) under plug-flow conditions into a single gas phase, olefin polymerization reactor, wherein the partially pre-activated catalyst precursor transferred into the reactor has been partially activated with one or more Lewis Acids such that the molar ratio of the Lewis Acid to the electron donor in the partially pre-activated catalyst precursor transferred into the reactor is about 0.1:1 to about 0.3:1, and adding an additional amount of the activator to the reactor in an amount sufficient to produce a homogeneous activated catalyst mixture, wherein the molar ratio of the Lewis Acid to the electron donor after the additional amount of activator is added is about 3:1 to about 20:1, wherein the catalyst is partially pre-activated in step (5) for a short residence time to minimize deactivation of the catalyst of about 1 minute to about 6 hours prior to the transferring step (6), and wherein said gas phase reactor is the sole olefin polymerization reactor.

15. The gas phase olefin polymerization process of claim 14, wherein the filler comprises a porous catalyst support.

16. The process of claim 14 wherein;
1) the catalyst precursor in step (1) corresponds to the formula:

$Mg_d(M)(OR)_cX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms and each OR group is the same or different;
M is a transition metal;
X is independently chlorine, bromine or iodine;
ED is an electron donor;
d is 0.5 to 56;
c is 0, 1, or 2;
f is 2 to 116;
g is >2 and up to 1.5(d)+3; and
2) the Lewis Acid of step (5) is
  i) one or more compounds with formula $m'(R''_n)X_{(3-n)}$ wherein M' is aluminum or boron; each X is independently chlorine, bromine, or iodine; each R" is independently a saturated aliphatic hydrocarbon radical having 1 to 14 carbon atoms, provided that when M is aluminum, n is 1 to 3 and when M is boron, n is 0 to 1.5; and
  ii) is added in an amount such that the mole ratio of total Lewis Acid to electron donor in the precursor is from about 0.1:1 to about 0.3:1.

17. The process of claim 14, wherein said Lewis Acid is;
  one or more alkylaluminum compound(s) with formula $M'(R''_n)X_{(3-n)}$ wherein M' is aluminum R" is n-butyl, n-hexyl, n-octyl, iso-octyl, isohexyl, or n-decyl, X is Cl or Br and n is a number from 0 to 1.5.

18. The process of claim 14, wherein said Lewis Acid is selected from the group consisting of triethylaluminum, tri-n-butyl aluminum, tri-n-hexyl aluminum, tri-n-octyl aluminum, tri n-decyl aluminum, triisoprenyl aluminum, dimethyl aluminum chloride, ethylaluminum dichloride, diethylaluminum chloride, and mixtures thereof.

19. The process of claim 14, wherein the catalyst precursor is partially preactivated by first contacting with diethylaluminum chloride followed by tri-n-hexyl aluminum.

20. The process of claim 14, wherein the activator includes a Lewis Acid having the formula $M'(R''_n)X_{(3-n)}$ wherein M' is aluminum;

each X is independently chlorine, bromine, or iodine;

each R" is independently a saturated aliphatic hydrocarbon radical having 1 to 14 carbon atoms; and n is 1 to 3; and wherein the catalyst is partially pre-activated in step (5) for about 15 minutes to about 45 minutes prior to the transferring step (6).

21. The process of claim 14, wherein a polymer comprising ethylene produced according to the process of claim 14 has a quantity of fines that is at least 10 percent less than the quantity of fines in a polymer produced under a comparative process under the same conditions except that the comparative process does not include the partial pre-activation of the catalyst precursor according to step (5) of the process of claim 14.

22. The process of claim 1, wherein a polymer comprising ethylene produced according to the process of claim 1 has a quantity of fines that is at least 10 percent less than the quantity of fines in a polymer produced under a comparative process under the same conditions except that the comparative process does not include the partial pre-activation of the catalyst precursor according to step (5) of the process of claim 1.

* * * * *